United States Patent

Gaebele et al.

[15] 3,691,302

[45] Sept. 12, 1972

[54] AUTOMATIC LIGHT CONTROL FOR LOW LIGHT LEVEL TELEVISION CAMERA

[72] Inventors: Rolf Gaebele, Redwood City; Jack H. Jones, Sunnyvale, both of Calif.

[73] Assignee: GTE Sylvania Incorporated

[22] Filed: Feb. 25, 1971

[21] Appl. No.: 118,660

[52] U.S. Cl...............................178/7.2, 178/DIG. 29

[51] Int. Cl...................................................H04n 5/14

[58] Field of Search..........................178/7.2, DIG. 29

[56] References Cited

UNITED STATES PATENTS

| | | | |
|---|---|---|---|
| 2,383,365 | 8/1945 | Beers | 178/DIG. 29 |
| 3,086,077 | 4/1963 | Mayer | 178/DIG. 29 |
| 3,555,181 | 1/1971 | Thommen | 178/DIG. 29 |
| 3,612,762 | 10/1971 | Wuellner et al. | 178/DIG. 29 |

*Primary Examiner*—Richard Murray
*Attorney*—Norman J. O'Malley, John F. Lawler and Elmer J. Nealon

[57] ABSTRACT

The video signal in a low light level television camera is fed to a first operational amplifier which continuously integrates this signal to produce an indication of the average value of the intensity of light in a viewed scene. The video signal is also applied to a pair of circuits that detect and store the peak values of the video signal in alternate fields formed by the scanning electron beam in the camera pick-up tube. During formation of one field, the peak value of the intensity of light in the viewed scene is detected and stored in one circuit while the stored indication of the peak intensity of the light detected by the other circuit during the preceding field is integrated in a second difference amplifier. The output voltage of the second amplifier is a measure of the difference between the stored peak voltage applied thereto and a reference voltage. This difference voltage is passed by a diode switch to a summing amplifier where it is combined with the average value signal from the first amplifier if the peak value signal indicates that the intensity of light from the viewed scene exceeds a prescribed peak reference light intensity. The combined signal is applied to a voltage translator which produces signal voltages of the correct polarities for varying the gains of image intensifier and vidicon pickup tubes of the camera inversely with respect to changes in the intensity of light from the viewed scene.

13 Claims, 7 Drawing Figures

AUTOMATIC LIGHT CONTROL FOR LOW LIGHT LEVEL TELEVISION CAMERA

BACKGROUND OF INVENTION

This invention relates to low light level television (LLLTV) cameras and more particularly to a circuit for automatically controlling the sensitivity of such a camera as a function of the average and peak values of the intensity of light from a viewed scene.

Peak and average light level control systems have previously been independently employed in LLLTV camera systems. The Apollo 7 and 8 command modules used by National Aeronautics and Space Administration in its lunar program carried television camera systems with provision for manually switching between either a peak or an average light level control circuit (see Journal of the Society of Motion Picture and Television Engineers (SMPTE), Vol. 79, January 1970, pages 1–6). Since LLLTV cameras are normally used in applications where only a small amount of ambient light is available, e.g., starlight, they may include image intensifiers for amplifying the available light. It is possible that a bright light source such as a headlight of an automobile may be directed into the lens of a LLLTV camera while the latter is operating at high gain on a dark night. If the gain of the intensifiers and vidicon pick-up tube are not immediately reduced, the photosensitive cathode of the intensifier or the photoconductive surface on the target electrode in the vidicon may be burned and the camera permanently damaged.

An object of this invention is the provision of control circuitry for automatically adjusting the gains of an image intensifier and the vidicon in a LLLTV camera as a function of both average and peak values of the light level in a viewed scene.

SUMMARY OF INVENTION

In accordance with this invention, the video signal in a LLLTV camera is integrated to produce an indication of the average value of the intensity of light in a viewed scene. Video signals produced during alternate fields are also peak detected, stored and integrated to produce indications of the peak value of the intensity of light in the viewed scene. If the peak intensity indications exceed a prescribed threshold level, the average and peak intensity indications are combined to produce control signals for decreasing the gains of the image intensifier and vidicon of the camera.

DESCRIPTION OF PREFERRED EMBODIMENT

Figure 1:
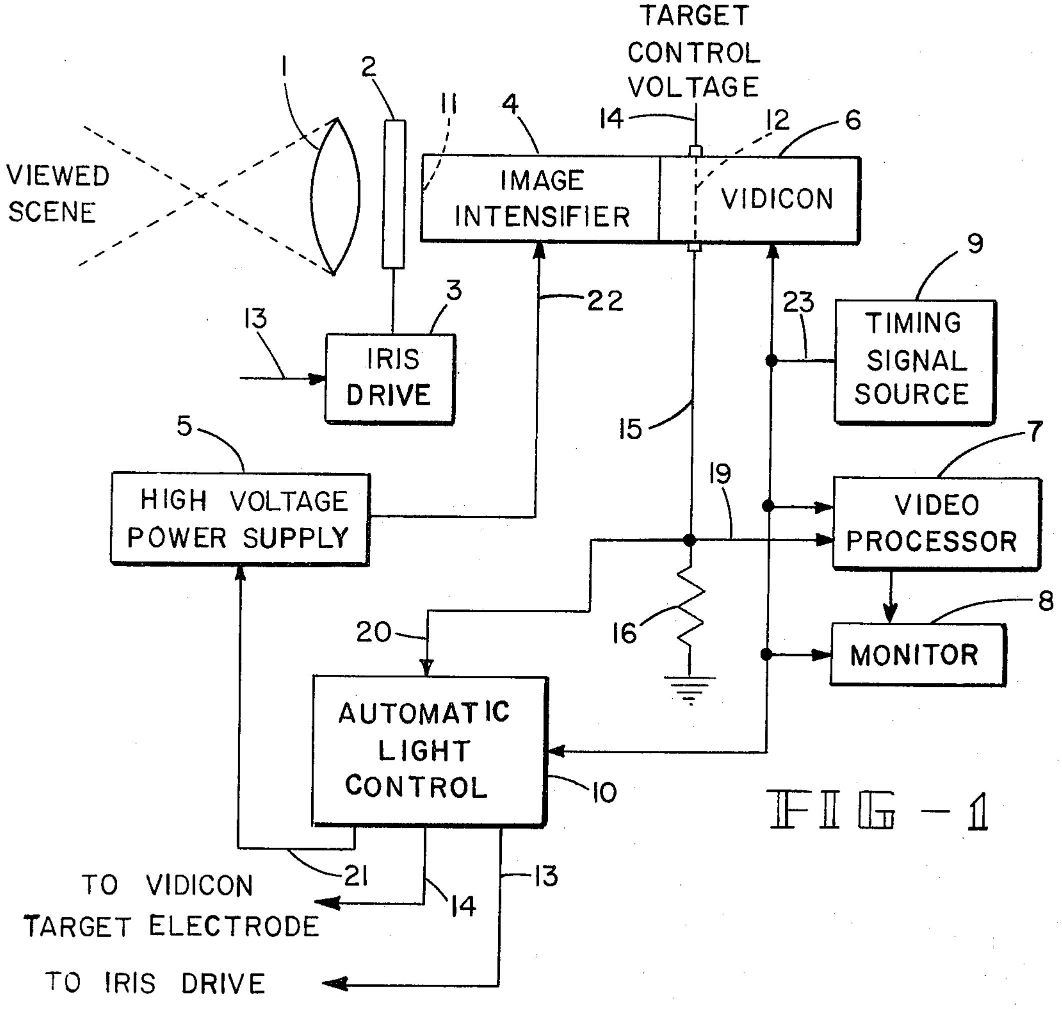
FIG. 1 is a schematic block diagram of a LLLTV camera embodying this invention.

A LLLTV camera embodying this invention is illustrated in FIG. 1 and comprises lens 1, iris 2 and associated drive motor 3, image intensifier tube 4 and associated high voltage power supply 5, camera pick-up tube 6, video processor 7, monitor 8, source 9 of timing signals, and automatic light control circuit 10. Image intensifier 4 is a light amplifier that increases by several orders of magnitude the intensity of light from a viewed scene that is focused by lens 1 onto the photosensitive cathode 11 of the intensifier. Power supply 5 produces a high negative voltage which is applied to the intensifier to control the gain thereof. The aperture in iris 2 varies the amount of light passed thereby to the intensifier. The size of the aperture may be varied by changing the control voltage applied on line 13 to iris drive motor 3.

Camera tube 6 may be a vidicon, plumbicon or other type of television camera pick-up tube. The intensifier 4 and vidicon 6 are connected so that the intensified light image from tube 4 is incident on the target electrode 12 of the vidicon. The target electrode is connected by line 14 to a source of voltage which controls the vidicon gain, and by line 15 through target resistor 16 to a ground reference potential. The video signal developed across target resistor 16 is coupled on lines 19 and 20 to the video processor 7 and automatic light control circuit 10, respectively. Source 9 produces timing signals for operation of the television camera such as the horizontal and vertical drive signals, vertical blanking pulses, synchronization pulses, etc. which are applied to the vidicon, video processor, monitor, and automatic light control circuit. As in conventional television systems, processor 7 is responsive to these timing signals for operating on the video signal for producing an optical image of the viewed scene on monitor 8 which may comprise a television picture tube.

Automatic light control circuit 10 is responsive to the video signal for producing control voltages on lines 13, 14 and 21. The voltage on line 13 is applied to the iris drive motor 3. The voltage on line 14 is applied to target electrode 12 and controls the gain of the vidicon. The voltage on line 21 controls the operation of the power supply 5, and thus the magnitude of the voltage on line 22 and the gain of the image intensifier. The magnitudes of the control voltages on lines 14 and 21 are proportional to the average value of the video signal on line 20, and thus the average value of the intensity of light from the viewed scene, until the peak value of the video signal, and thus the peak intensity of light from the viewed scene, exceeds a prescribed threshold level. When the peak intensity of light in the viewed scene exceeds this prescribed level, the magnitudes of the control voltages on lines 13, 14 and 21 are a function of the sum of the average and peak values of the video signal.

Briefly, light from the viewed scene that is focused by lens 1 onto photocathode 11 is intensified by tube 4. The intensified light illuminates the target electrode to produce an image of the viewed scene thereon. This image is sensed by sequentially scanning the target with an electron beam that is generated in the vidicon. The scanning electron beam deposits electrons on electrode 12 in accordance with variations in the intensity of the image impressed on the target. The remaining electrons in the scanning beam return to a grid (not shown) of the vidicon and are passed by line 15 through target resistor 16 to produce the video signal. The amplitude of this video signal varies in time as a function of the intensity of the image.

The vidicon is responsive to timing signals from source 9 for determining the path traversed by the scanning electron beam. As in conventional television equipment, the scanning sequence for the electron beam is to move back and forth across the target to first sweep out 262.5 vertically-spaced horizontal lines in one-sixtieth second. The time required to sweep out this first set of 262.5 lines is called a field and is referred to hereinafter as an odd field. During the next one-sixtieth second the electron beam sweeps out another field of 262.5 horizontal lines which are interlaced with the lines of the first or odd field to form a complete picture which is called a frame. The second field is referred to hereinafter as an even field. This raster scanning sequence of the electron beam is continuously repeated to alternately produce odd and even fields. Processor 7, monitor 8 and automatic light control circuit 10 are responsive to timing signals from source 9 for synchronized operation with the vidicon.

Figure 2:
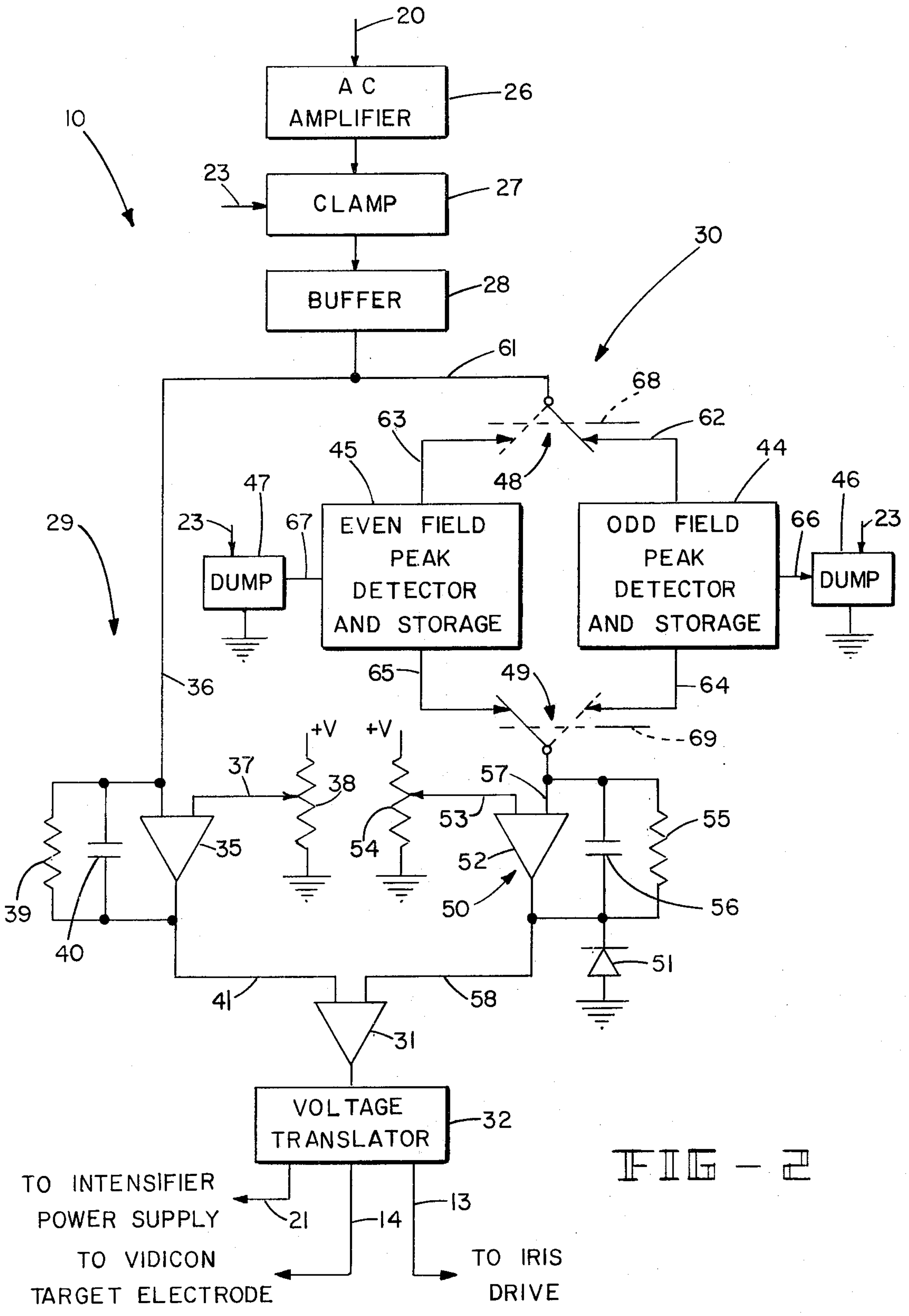
FIG. 2 is a schematic block and circuit diagram of the automatic light control circuit in FIG. 1.

Referring now to FIG. 2, automatic light control circuit 10 comprises AC amplifier 26, keyed clamp circuit 27, buffer amplifier 28, average and peak detection circuits 29 and 30, respectively, amplifier 31 and voltage translator 32. Keyed clamp circuit 27 comprises a field effect transistor, which is gated as a switch by one of the timing signals on line 23 and is employed to restore the DC reference level to the amplified video signal. Amplifier 31 is a summing amplifier which combines the output signals of detection circuits 29 and 30. Voltage translator 32 is responsive to the output of the summing amplifier for producing signals of the proper polarity on lines 14 and 21 for adjusting the gains of the vidicon and intensifier, respectively, and the signal on line 13. The voltage translator may comprise an inverting amplifier for causing the signals on lines 14 and 21 to be of the opposite polarities.

Average detection circuit 29 comprises operational amplifier 35 having a first input line 36 connected to the output of the buffer amplifier and a second input line 37 connected to a reference voltage which is developed across potentiometer 38. A high pass filter comprising resistor 39 and capacitor 40 is connected between the first input line 36 and the output line 41 of the amplifier to form a low pass filter or integrator which averages the amplified video signal. The time constant of the integrator is chosen large enough to ensure stable operation of the control loop associated with amplifier 35.

Peak detection circuit 30 comprises odd and even field peak detector and storage circuits 44 and 45, respectively; dump circuits 46 and 47; input and output switches 48 and 49, respectively, which are represented schematically in FIG. 2; integrator circuit 50; and diode switch 51. Circuit 50 comprises an operational amplifier 52 having a first input line 53 connected to a reference voltage which is developed across potentiometer 54. A high pass filter comprising resistor 55 and capacitor 56 is connected between a second input line 57 and the output line 58 of amplifier 52 to form a low pass filter or integrator. The time constant of integrator circuit 50 is also chosen large enough to ensure stable operation of the control loop.

The video signal from the buffer amplifier on line 61 is selectively coupled through switch 48 to the input lines 62 and 63 of detector-storage circuits 44 and 45, respectively. Signals stored by circuits 44 and 45 are selectively connected through lines 64 and 65, respectively, and switch 49 to the input line 57 of amplifier 52. Detector-storage circuits 44 and 45 are connected through lines 66 and 67 and dump circuits 46 and 47, respectively, to a ground reference potential. The operation of input and output switches 48 and 49 is illustrated schematically as being controlled by signals on lines 68 and 69, respectively. Circuits 44 and 45 may each comprise a rectifier diode (not shown) connected in series between the associated input and output lines and a storage capacitor (not shown) connected between the output of the rectifier diode and a ground reference potential.

As stated previously, the video signal on line 20 is a direct measure of the intensity of light from the viewed scene that is incident on the face of the intensifier at any instant in time. The amplified video signal passed by AC amplifier 26 is DC restored in the keyed clamp circuit to establish appropriate reference levels prior to application of this signal through isolation stage 28 to the detection circuits 29 and 30. Circuit 29 continuously integrates the video signal on line 36 for producing a signal on line 41 having an amplitude that is proportional to the average value of the video signal, and thus to the average value of the intensity of light from the viewed scene.

The operation of switches 48 and 49 are synchronized with the field frequency of the scanning electron beam in the vidicon. During the odd fields, electrical signals on lines 68 and 69 cause switches 48 and 49, respectively, to be connected as shown by the solid lines in FIG. 2. The signals on lines 68 and 69 during the even fields, however, cause the associated switches 48 and 49 to be connected as shown by the dashed lines in FIG. 2.

Assuming the system has been operating for a period of time, at the start of a current odd field, circuit 46 is momentarily responsive to a vertical blanking pulse on a line 23 for dumping the signal stored by circuit 44. During remainder of this odd field, circuit 44 detects and stores the peak value of the video signal which is coupled through switch 48 to input line 62. This peak signal stored by circuit 44 is blocked from amplifier 52 during this odd field by switch 49. During this same odd field, however, the peak value of the video signal detected and stored by circuit 45 in the previous even field is coupled through switch 49 to amplifier 52. Circuit 50 integrates this signal to produce a signal on line 58 that is a measure of the peak value of the intensity of light from the viewed scene during the previous field. If the amplitude of the signal on line 57, and thus the peak intensity of light in the viewed scene, is less than a prescribed threshold level set by diode 51 and potentiometer 54, diode 51 conducts and shunts the signal on line 58 to ground and thereby blocks the output of detection circuit 30 from the summing amplifier 31. If the amplitude of the signal on line 57 exceeds the prescribed threshold level, however, diode 51 is cut off and the signal on line 58 is coupled to the summing amplifier.

At the start of the subsequent even field, circuit 47 is momentarily responsive to a vertical blanking pulse on line 23 for dumping the signal stored by circuit 45. During this even field the video signal is coupled through switch 48 to circuit 45 which detects and stores the peak value thereof. This stored signal in circuit 45 is blocked from amplifier 52 during the even field by switch 49. The peak value of the video signal detected and stored by circuit 44 in the previous odd field is coupled to amplifier 52 during this even field, however, and is integrated by circuit 50. Application of the output signal of integrator 50 to the summing amplifier is controlled by diode switch 51 as stated above. This operation is repeated during subsequent odd and even fields.

The indications of the average and peak values of the intensity of light from the viewed scene on lines 41 and 58, respectively, are combined in amplifier 31 and adjusted by translator 32 to have the desired polarity for automatically changing the gains of the vidicon and intensifier. If the peak value of the intensity of light from the viewed scene is low, diode switch 51 blocks the output signal of integrator 50 from the summing amplifier and the control signals on lines 13, 14 and 21 are a function only of the measure of the average value of the intensity of light from the viewed scene that is produced by circuit 29. If the average intensity of light from the viewed scene and the magnitude of the signal on line 41 are high, the outputs of the voltage translator reduce the gains of the intensifier and vidicon accordingly. Conversely, if the average value of the intensity of light from the viewed scene and the magnitude of the signal on line 41 are low, the signal on line 13 causes an increase in the size of the iris aperture and the signals on lines 14 and 21 cause a corresponding increase in the gains of the vidicon and intensifier, respectively. When the peak light level of the viewed scene is high such that the amplitude of the signal on line 57 exceeds the prescribed threshold level, the signal on line 58 reverse biases and cuts off diode switch 51 thereby connecting the output of integrator 50 to summing amplifier 31. In this instance the output signals of the average and peak detection circuits on lines 41 and 58 are combined to produce the signal on line 13 which decreases the size of the iris aperture and the control signals on lines 14 and 21 which reduce the gains of the vidicon and intensifier, respectively, to maintain a constant peak video signal (corresponding to threshold value) and prevent damage of the vidicon and intensifier by incident light from the viewed scene.

Figures 4A, 4B, 4C, 4D:
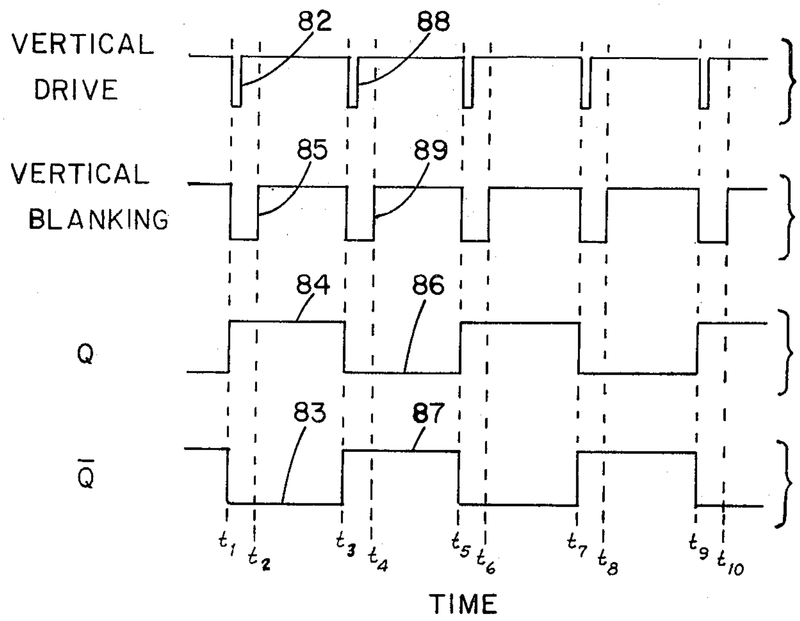
FIGS. 4A–4D are waveforms useful in explaining the operation of the circuit in FIG. 3.
Figure 3:
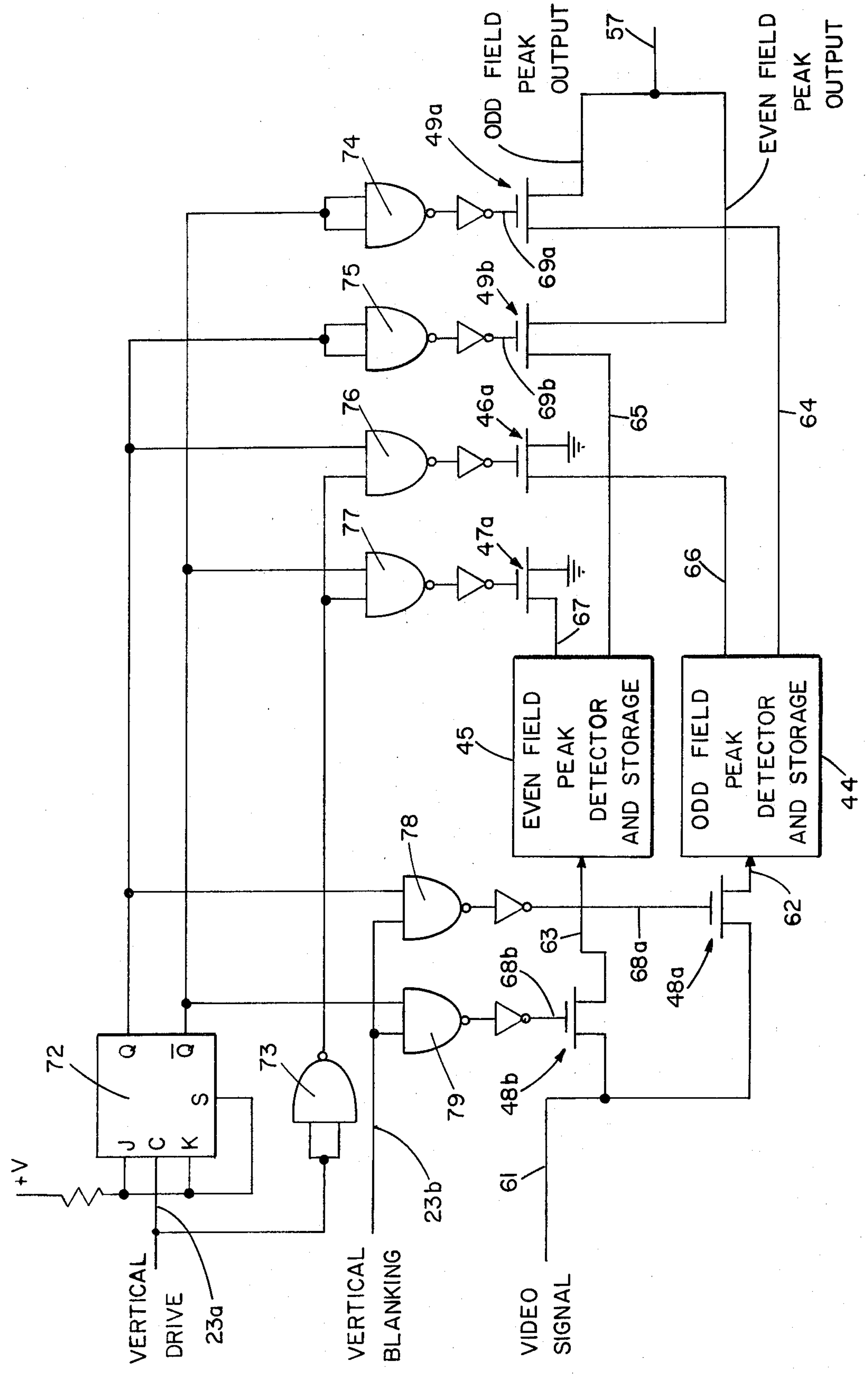
FIG. 3 is a schematic circuit diagram of the peak detection circuit in FIG. 2.

A more detailed representation of the peak detection circuit 30 is illustrated in FIG. 3 wherein similar elements in FIGS. 2 and 3 are designated by the same reference characters. Waveforms useful in explaining the operation of detection circuit 30 are illustrated in FIGS. 4A–4D wherein the waveform in FIG. 4A represents vertical drive pulses; the waveform in FIG. 4B represents vertical blanking pulses; and the waveforms in FIGS. 4C and 4D represent the Q and $\overline{Q}$ outputs, respectively, of the J–K flip-flop 72 which is described more fully hereinafter. Referring now to FIG. 3, detection circuit 30 comprises odd and even field peak detector and storage circuits 44 and 45, respectively; input switches **48*a* and 48*b*; dump circuit switches 46*a* and 47*a*; output switches 49*a* and 49*b*; J–K flip-flop 72; and NAND gate 73. The switches may, by way of example, be N channel metal oxide silicon field effect transistor (MOSFET) devices whose conduction is controlled by driver circuits comprising associated NAND gates and inverting amplifiers which are connected in series to the gate electrodes of the switches. The video signal on line 61 is coupled through input switches 48*a* and 48*b* to input lines 62 and 63, respectively, of the associated detector-storage circuits. The output lines 64 and 65 of the detector-storage circuits are coupled through output switches 49*a* and 49*b*, respectively, to line 57. Similarly, the output lines 66 and 67 are coupled through associated dump switches 46*a* and 47*a*** to the ground reference potential.

The vertical drive pulses produced by source 9 (see FIG. 1) are applied on line **23*a* (see FIG. 3) to the clock input of flip-flop 72 and to both inputs of gate 73. The output of NAND circuit 73 is applied to one input of both of the dump circuit gates 76 and 77. The Q and $\overline{Q}$ outputs of flip-flop 72 are applied to the other inputs of dump circuit gates 76 and 77, respectively. The Q output of the flip-flop is also applied to both inputs of output switch gate 75 and to one input of input switch gate 78. Similarly, the $\overline{Q}$ output of the flip-flop is applied to both inputs of output switch gate 74 and to one input of the other input switch gate 79. The vertical blanking pulses produced by source 9 are applied to the other inputs of input switch gates 78 and 79**.

The pulse repetition frequency of the vertical drive pulses in FIG. 4A is equal to the field frequency of 60 Hz. Each time interval (such as from time $t_1$ to time $t_3$ in FIG. 4A) between vertical drive pulses corresponds to the duration of a field. In operation, flip-flop 72 is responsive to each vertical drive pulse on line **23*a* for changing operating states. Consider that operation of the system is stabilized prior to receipt of vertical drive pulse 82 (see FIG. 4A, time $t_1$) at the beginning of an odd field. Drive pulse 82 causes the flip-flop to change operating states to make the Q and $\overline{Q}$ outputs thereof high and low (see FIGS. 4C and 4D), respectively, throughout the odd field between times $t_1$ and $t_3$. The low $\overline{Q}$ output signal 83 maintains input switch 48b, dump switch 47*a* and output switch 49*a* open during this odd field. The high Q output pulse 84, however, causes output switch 49*b* to close during the odd field to connect the peak signal stored by even field detector and storage circuit 45 during the previous even field to output line 57. During the vertical drive pulse 82, both inputs to gate 76 are high for closing switch 46*a* long enough to dump the peak signal stored by circuit 44. Dump switch 46*a* is open for the remainder of this odd field. The vertical blanking pulse 85 (see FIG. 4B) maintains input switch 48*a* open until time $t_2$ when both inputs to gate 78 are high. Switch 48*a* is closed between times $t_2$ and $t_3$ for connecting the video signal to the odd field circuit 44 where the peak value thereof is detected and stored. Thus, it is seen that during an odd field such as between times $t_1$ and $t_3$ switch 46*a* is closed momentarily during the drive and blanking pulses 82 and 85, respectively, to dump the signal detected during the previous odd field and stored by circuit 44; input switch 48*a* is closed to connect the video signal to circuit 44 where the peak value thereof during this current odd field is detected and stored; and, output switch 49*b* is closed to connect the peak signal detected and stored during the previous even field by circuit 45 to output line 57**.

During the subsequent even field between times $t_3$ and $t_5$, the Q and $\overline{Q}$ outputs 86 and 87 are low and high (see FIGS. 4C and 4D), respectively. Input switch 48*a*, dump switch 46*a* and output switch 49*b* are maintained open by the low Q output pulse 86 of the flip-flop. The high $\overline{Q}$ output pulse 87, however, maintains output switch 49*a* closed during this even field to connect the peak signal detected and stored by circuit 44 during the previous odd field between times $t_1$ and $t_3$ to output line 57. Since both inputs to gate 77 are momentarily high during the vertical drive pulse 88 (see FIG. 2A, time $t_3$) switch 47*a* closes long enough to dump the peak signal stored by circuit 45. On termination of vertical blanking pulse 89 at time $t_4$ (see FIG. 4B) both of the inputs to gate 79 are high causing input switch 48*b* to close to connect the video signal to circuit 45 where the peak value thereof is detected and stored. Thus, it is seen that during an even field such as between times $t_3$ and $t_5$ switch 47*a* is closed momentarily during drive pulse 88 to dump the signal stored during the previous even field; input switch 48*b* is closed to connect the video signal to circuit 45 where the peak value thereof during this current even field is detected and stored; and, output switch 49*b* is closed to connect the peak signal detected and stored by circuit 44 during the previous odd field between times $t_1$ and $t_3$ to output line 57. This operation is repeated during alternate fields.

What is claimed is:

1. In a low light level television camera including a camera pick-up tube and an image intensifier tube for increasing the intensity of light from a viewed scene that is incident on it and for producing an image of the viewed scene in the pick-up tube which is responsive to control signals for alternately scanning the image in odd and even fields to produce a video signal having an amplitude that is a time varying function of the intensity of the image and thus the intensity of the light from the viewed scene, an automatic light control (ALC) circuit comprising first means responsive to a video signal for producing a first output signal having an amplitude that is an indication of the average value thereof and thus is an indication of the average value of the intensity of light from the viewed scene, second means responsive to the video signal for producing a second output signal having an amplitude that is an indication of the peak value thereof and thus is an indication of the peak value of the intensity of light from the viewed scene, and third means for automatically selectively combining the first and second output signals for producing third and fourth control signals which are applied to the pick-up tube and intensifier, respectively, for automatically adjusting the gains thereof as a function of the intensity of light from the viewed scene.

2. The ALC circuit according to claim 1 wherein said second means, during a current field: is detecting and storing an indication of the peak value of the video signal produced during the current field for storage during the subsequent field; and, is operating on a stored indication of the peak value of the video signal which was obtained during the previous field for producing the second output signal.

3. The ALC circuit according to claim 2 wherein said second means comprises odd and even field peak detection and storage circuits, first coupling means alternately coupling the video signal to said odd and said even field peak detection and storage circuits during consecutive fields, each of said detection-storage circuits detecting the peak value of the video signal during the field this signal is connected thereto and storing this detected signal during the subsequent field, and second coupling means alternately coupling a stored signal from said even and said odd field peak detection and storage circuits during consecutive fields.

4. The ALC circuit according to claim 3 wherein said first and second coupling means are each responsive to control signals from the camera for operating out of phase with each other during the same field for causing said first coupling means to couple the video signal to one detection-storage circuit while said second coupling means couples a stored signal from the other detection-storage circuit.

5. The ALC circuit according to claim 4 wherein said second means comprises fourth means establishing a prescribed threshold level, and said third means comprises a summing circuit receiving the first and second output signals and fifth means detecting when the amplitude of a stored signal coupled from one of said detection-storage circuits is greater than the prescribed threshold level, said summing circuit combining the first and second output signals during a current field only when a stored signal coupled from an associated peak detection-storage circuit exceeds the prescribed threshold level.

6. The ALC circuit according to claim 5 wherein said second means comprises a pair of dump circuits, each of said dump circuits being coupled to a different one of said detection-storage circuits and responsive to control signals from the camera for dumping at the start of a current field the signal stored in the peak detection-storage circuit having the video signal coupled thereto.

7. The ALC circuit according to claim 6 wherein said fourth means comprises a source of variable reference voltage, and said second means comprises a differential integrator circuit for averaging the difference between the reference voltage and the stored signal passed by said second coupling means for producing the second output signal, said fifth means passing the output signal of said differential integrator circuit to said summing circuit where it is combined with the first output signal only when the amplitude of the stored signal passed by said second coupling means exceeds the prescribed threshold level.

8. The ALC circuit according to claim 7 wherein said fifth means comprises the diode switch which is cut off by an output signal of the differential integrator circuit when the amplitude of the stored signal passed by said second coupling means exceeds the prescribed threshold level for coupling the former signal to said summing circuit.

9. The ALC circuit according to claim 8 wherein said first and second coupling means each comprises a pair of field effect transistor switches and each dump circuit comprises a field effect transistor switch.

10. The ALC circuit according to claim 9 including the series combination of a NAND gate and an inverting amplifier coupled to the gate electrode of and driving each of said transistor switches.

11. The ALC circuit according to claim 10 wherein said third means comprises a voltage translator for causing the first and second control signals to be of the opposite polarity.

12. In a low light level television camera including a camera pick-up tube and an image intensifier tube for increasing the intensity of light from a viewed scene that is incident on it and for producing an image of the viewed scene in the pick-up tube which is responsive to control signals for alternately scaning the image in odd and even fields to produce a video signal having an amplitude that is a time varying function of the intensity of the image and thus the intensity of the light from the viewed scene, an automatic light control (ALC) circuit comprising first means responsive to a video signal for producing a first output signal having an amplitude that is an indication of the average value thereof and thus is an indication of the average value of the intensity of light from the viewed scene, second means responsive to the video signal for producing a second output signal having an amplitude that is an indication of the peak value thereof and thus is an indication of the peak value of the intensity of light from the viewed scene, and third means for automatically combining the first and second output signals for producing a third signal which is applied to one of said tubes for automatically adjusting the gains thereof as a function of the intensity of light from the viewed scene.

13. In a television camera including a motor driven iris arranged for passing light through a variable size aperture therein to the intensifier, the ALC circuit according to claim 12 wherein said third means produces a fourth control signal which is applied to the motor driven iris for adjusting the size of the aperture therein.

* * * * *